United States Patent
Patel et al.

(10) Patent No.: US 11,866,642 B1
(45) Date of Patent: Jan. 9, 2024

(54) METHODS FOR REGENERATING SOLVENTS AND SEQUESTERING CARBON DIOXIDE

(71) Applicant: Saudi Arabian Oil Company, Dhahran (SA)

(72) Inventors: Hasmukh A. Patel, Katy, TX (US); Anuj Gupta, Katy, TX (US); Esam Z. Hamad, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/814,142

(22) Filed: Jul. 21, 2022

(51) Int. Cl.
*E21B 41/00* (2006.01)
*C09K 8/592* (2006.01)
*C09K 8/66* (2006.01)

(52) U.S. Cl.
CPC .............. *C09K 8/592* (2013.01); *C09K 8/665* (2013.01); *E21B 41/0064* (2013.01)

(58) Field of Classification Search
None
See application file for complete search history.

(56) References Cited

U.S. PATENT DOCUMENTS

| | | | |
|---|---|---|---|
| 10,131,833 B2 | 11/2018 | Liang et al. | |
| 10,569,956 B1 | 2/2020 | Keshner et al. | |

(Continued)

FOREIGN PATENT DOCUMENTS

| | | |
|---|---|---|
| CA | 2753393 C | 9/2013 |
| CN | 106587062 A | 4/2017 |

(Continued)

OTHER PUBLICATIONS

Brethome et al., "Direct air capture of CO2 via aqueous-phase absorption and crystalline-phase release using concentrated solar power", Nature Energy, vol. 3, pp. 553-559. https://doi.org/10.1038/s41560-018-0150-z, 2018.

(Continued)

*Primary Examiner* — Andrew Sue-Ako
(74) *Attorney, Agent, or Firm* — DINSMORE & SHOHL LLP

(57) ABSTRACT

A method for the subterranean regeneration of $CO_2$-philic solvents and the sequestration of carbon dioxide may include exposing the $CO_2$-philic solvent to a carbon dioxide-containing gas in an absorber to allow the $CO_2$-philic solvent to absorb at least a portion of the carbon dioxide in the carbon dioxide-containing gas, thereby producing a $CO_2$-containing solution. The $CO_2$-containing solution may be supplied to one or more porous rock fractures via one or more injection conduits in fluid communication with the one or more porous rock fractures. The $CO_2$-containing solution may be heated via heat provided by one or more rock fractures in order to release at least a portion of the absorbed carbon dioxide into the one or more rock fractures and thereby regenerate the $CO_2$-philic solvent. At least a portion of the released carbon dioxide may be sequestered by adsorbing the carbon dioxide within the porous rock fractures or by reacting the released carbon dioxide with the porous rock fractures to form stable carbonates. The regenerated $CO_2$-philic solvent may be transported from the one or more porous rock fractures via one or more production conduits.

14 Claims, 2 Drawing Sheets

(56) References Cited

U.S. PATENT DOCUMENTS

| | | | | |
|---|---|---|---|---|
| 2007/0227732 | A1* | 10/2007 | Miller | C09K 8/62 |
| | | | | 166/292 |
| 2011/0209882 | A1* | 9/2011 | Enis | E21B 43/164 |
| | | | | 166/402 |
| 2021/0178317 | A1* | 6/2021 | Arkadakskiy | B01D 53/1475 |

FOREIGN PATENT DOCUMENTS

| | | |
|---|---|---|
| FR | 2982169 A1 | 5/2013 |
| WO | 2012092404 A1 | 7/2012 |

OTHER PUBLICATIONS

Gadipelli et al., "An Ultrahigh Pore Volume Drives Up the Amine Stability and Cyclic CO2 Capacity of a Solid-Amine@Carbon Sorbent", Adv. Mater. vol. 27, pp. 4903-4909. https://doi.org/10.1002/adma.201502047, 2015.

Garrabrant et al., "Energy-Efficient CO2 Capture from Flue Gas by Adsorption with Amino Acids and Crystallization with a Bis-Iminoguanidine", Ind. Eng. Chem. Res., vol. 58, pp. 10510-10515. https://doi.org/10.1021/acs.iecr.9b00954, 2019.

Lee et al., "Comparisons of Amine Solvents for Post-combustion CO2 Capture: A Multi-objective Analysis Approach", International Journal of Greenhouse Gas Control, vol. 18, pp. 68-74. http://dx.doi.org/10.1016/j.ijggc.2013.06.020, 2013.

Patel et al., "Carbon Dioxide Capture Adsorbents: Chemistry and Methods", ChemSusChem, vol. 10, pp. 1303-1317, https://doi.org/10.1002/cssc.201601545, 2017.

Patel et al., "Highly optimized CO2 capture by inexpensive nanoporous covalent organic polymers and their amine composites", Faraday Discussions, vol. 183, pp. 401-412, 2015.

Stowe et al., "Fundamental Understanding of CO2 Capture and Regeneration in Aqueous Amines from First-Principles Studies: Recent Progress and Remaining Challenges", Ind. Eng. Chem. Res., vol. 56, pp. 6887-6899. https://doi.org/10.1021/acs.iecr.7b00213, 2017.

Notification of Transmittal of the International Search Report and the Written Opinion of the International Searching Authority, or the Declaration dated Sep. 21, 2023 pertaining to International application No. PCT/US2023/025822 filed Jun. 21, 2023, pp. 1-15.

* cited by examiner

METHODS FOR REGENERATING SOLVENTS AND SEQUESTERING CARBON DIOXIDE

BACKGROUND

Field

Embodiments described herein generally relate to carbon dioxide sequestration and, specifically, to methods for the subterranean regeneration of solvents and sequestration of carbon dioxide.

Technical Background

The observed warming of the Earth's climate, which is largely attributed to anthropogenic carbon dioxide emissions, is one of the largest problems facing the planet. It is predicted that growing energy demands will continue to keep demand for fossil fuel based energy production high. As such, there is a worldwide need for ways to decrease emissions from fossil fuel based energy production. Capturing and sequestering carbon dioxide gas released from fossil fuel based energy production has been proposed as a possible solution. However, conventional carbon capture technologies are energy intensive as the $CO_2$-philic solvents used to capture carbon dioxide gas need to be heated to release the carbon dioxide and this heating may require a large amount of energy. Additionally, in order to store the captured carbon dioxide the carbon dioxide gas must often be compressed which is also an energy intensive process. The energy used to power conventional carbon capture technologies is often provided by burning additional fossil fuels increasing the cost of the energy produced and producing more carbon dioxide. Thus, there is a need for carbon capture processes that do not require the burning of additional fossil fuels, and that have reduced energy demands.

SUMMARY

Embodiments of the present disclosure meet this need for carbon capture technologies that may not require the burning of additional fossil fuels and that may have reduced energy demands. It has been discovered that by releasing carbon dioxide directly from a $CO_2$-philic solvent to one or more porous rock fractures for sequestration and by using the heat present in underground rock fractures to regenerate the $CO_2$-philic solvent, one may reduce the amount of additional fossil fuels that are burned to power carbon capture and sequestration. For example, by removing the need to compress carbon dioxide gas and by using geothermal energy to regenerate the $CO_2$-philic solvent as opposed to using energy generated from burning fossil fuels.

According to one or more embodiments of the present disclosure, a method for the subterranean regeneration of $CO_2$-philic solvents and the sequestration of carbon dioxide is provided. The method may comprise exposing the $CO_2$-philic solvent to a carbon dioxide-containing gas in an absorber to allow the $CO_2$-philic solvent to absorb at least a portion of the carbon dioxide in the carbon dioxide-containing gas, thereby producing a $CO_2$-containing solution. The method may further comprise supplying the $CO_2$-containing solution to one or more porous rock fractures via one or more injection conduits in fluid communication with the one or more porous rock fractures and heating the $CO_2$-containing solution via heat provided by one or more rock fractures in order to release at least a portion of the absorbed carbon dioxide into the one or more rock fractures and thereby regenerate the $CO_2$-philic solvent. The method may further comprise sequestering at least a portion of the released carbon dioxide within the one or more rock fractures by adsorbing, or chemically reacting the released carbon dioxide within the porous rock adjacent to the fractures. The method may also further comprise transporting the regenerated $CO_2$-philic solvent from the one or more porous rock fractures via one or more production conduits.

It is to be understood that both the preceding general description and the following detailed description describe various embodiments and are intended to provide an overview or framework for understanding the nature and character of the claimed subject matter. Additional features and advantages of the embodiments will be set forth in the detailed description and, in part, will be readily apparent to persons of ordinary skill in the art from that description, which includes the accompanying drawings and claims, or recognized by practicing the described embodiments. The drawings are included to provide a further understanding of the embodiments and, together with the detailed description, serve to explain the principles and operations of the claimed subject matter. However, the embodiments depicted in the drawings are illustrative and exemplary in nature, and not intended to limit the claimed subject matter.

BRIEF DESCRIPTION OF DRAWINGS

The following detailed description may be better understood when read in conjunction with the following drawings, in which.

DETAILED DESCRIPTION

Figure 1:
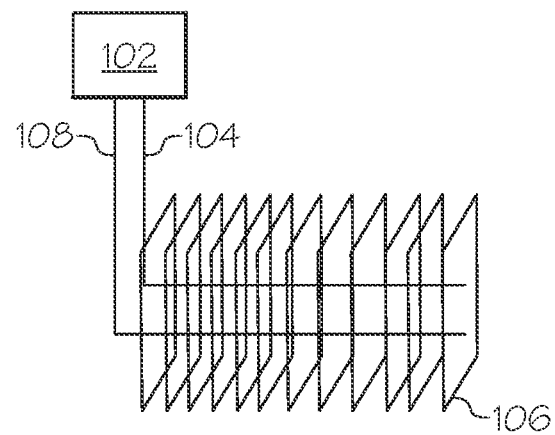
FIG. 1 is a schematic depiction of a carbon sequestration system suitable for use with embodiments of the present disclosure.

The present disclosure is generally directed to a method for the subterranean regeneration of $CO_2$-philic solvents and the sequestration of carbon dioxide. The method may generally include exposing the $CO_2$-philic solvent to a carbon dioxide-containing gas in an absorber to allow the $CO_2$-philic solvent to absorb at least a portion of the carbon dioxide in the carbon dioxide-containing gas, thereby producing a $CO_2$-containing solution. The method may further comprise supplying the $CO_2$-containing solution to one or more porous rock fractures via one or more injection conduits in fluid communication with the one or more porous rock fractures. The method may also comprise heating the $CO_2$-containing solution via heat provided by one or more rock fractures in order to release at least a portion of the absorbed carbon dioxide into the one or more rock fractures and thereby regenerate the $CO_2$-philic solvent. The method may further comprise sequestering at least a portion of the released carbon dioxide within the one or more porous rock fractures by adsorbing or chemically reacting the released carbon dioxide with the porous rock fractures and the porous rock adjacent to the fractures, and transporting the regenerated $CO_2$-philic solvent from the one or more porous rock fractures via one or more production conduits.

As used throughout this disclosure, the term "$CO_2$-philic solvent" refers to a solvent, which can reversibly absorb $CO_2$, and then can release the absorbed $CO_2$ when heated. The $CO_2$-philic solvent can be any suitable solvent that will reversibly absorb $CO_2$. For example, the $CO_2$-philic solvent may be an aqueous solution of one or more of monoethanolamine, diethanolamine, triethanolamine, 2-amino-2-methyl-1-propanol, piperazine, diglycolamine, glycine salts, sarcosine salts, lithium carbonate, sodium carbonate, or potassium carbonate.

As used throughout this disclosure, the term "$CO_2$-containing gas" refers to any gas or gas mixtures, which comprises carbon dioxide. The $CO_2$-containing gas may include other gaseous components. For example, the $CO_2$-containing gas may include $CO_2$ and one or more of gaseous hydrocarbons, $H_2S$, $SO_2$, $N_2$, Ar, water vapor, and $O_2$.

As used throughout this disclosure, the term "flue gas" refers to any gas emission from a suitable exhaust source. For example, flue gas may include the emissions from a vehicle, a fossil fuel power plant, a cement factory, or any other suitable industrial or non-industrial emission source.

As used throughout this disclosure, the term "porous rock formation" refers to any rock formation, which may have the capacity to store $CO_2$ in a physical form or react with $CO_2$ to form stable carbonates. Porous rock formations may include mafic rock. The term mafic generally describes a silicate mineral or igneous rock that is rich in magnesium and iron. Mafic minerals can be dark in color, and rock-forming mafic minerals include olivine, pyroxene, amphibole, and biotite. Examples of mafic rocks include basalt, diabase, and gabbro. Examples of ultramafic rocks include dunite, peridotite, and pyroxenite. Chemically, mafic and ultramafic rocks can be enriched in iron, magnesium, and calcium. A porous rock formation comprising mafic rock can allow components of an injected stream to react in situ with components of the mafic rock to precipitate and store components of the injected stream in the formation. In some embodiments, the mafic rock comprises basaltic rock. In some embodiments, $CO_2$ may be stored in rock formations as an adsorbate in porous rocks or dissolved in fluids contained in the formation such as water (brine) or hydrocarbons.

As used throughout this disclosure, the term "porous rock fractures" refers to any fracture within a porous rock formation, which is large enough to receive a $CO_2$-philic solvent. Porous rock fractures may be formed naturally or they may be man-made. For example, through a process such as hydraulic fracturing.

As used throughout this disclosure, the term "wellbore" refers to a bored well within a formation capable of receiving injection water, other aqueous solutions, or other liquids or gases. The wellbore can be vertical, horizontal, or positioned at any angle within the formation. A wellbore forms a pathway capable of permitting both fluids and apparatus to traverse between the surface and the formation.

As used throughout this disclosure, the term "injection conduit" refers to any suitable channel in fluid communication with one or more porous rock formations in which fluid may flow from the injection conduit into one or more porous rock formations. Injection conduits may include pipes, tubes, perforations or any other structure that can carry fluid into one or more porous rock formations.

As used throughout this disclosure, the term "production conduit" refers to any suitable channel in fluid communication with one or more porous rock formations in which fluid may flow from one or more porous rock formations into the production conduit. Production conduits may include pipes, tubes, perforations or any other structure that can carry fluid into one or more porous rock formations.

Now referring to FIG. 1, an example system 100 that may be suitable for use with the methods described herein is schematically depicted. The system 100 generally comprises an absorber 102, an injection conduit 104 that is in fluid communication with the absorber 102 and one or more porous rock fractures 106, and a production conduit 108 that is in fluid communication with the one or more porous rock fractures 106. In one or more embodiments, a $CO_2$-philic solvent may be contacted with a $CO_2$-containing gas within the absorber 102 in a countercurrent or cocurrent fashion to form a $CO_2$-containing solution. As used throughout the disclosure, the term "cocurrent" refers to the flow pattern where the gas is flowing in a similar direction to the flow of the solvent. As used throughout the disclosure, the term "countercurrent" refers to the flow pattern where the gas is flowing in a different direction to the flow of the solvent. The $CO_2$-containing solution may travel from the absorber 102 to the one or more porous rock fractures 106 via the injection conduit 104. The $CO_2$-containing solution may be heated by the contact with the porous rock adjacent to the one or more porous rock fractures 106 to release $CO_2$ gas and to produce a regenerated $CO_2$-philic solvent. In one or more embodiments, the released $CO_2$ gas may be adsorbed by or react with the porous rock formations 106 to form stable carbonates. The regenerated $CO_2$-philic solvent may exit the one or more porous rock fractures 106 via the production conduit. In one or more embodiments, the production conduit 108 may be in fluid communication with the absorber 102 and the $CO_2$-philic solvent may be returned to the absorber 102 from the porous rock formations 106 via the production conduit 108, such that the $CO_2$-philic solvent may be cycled between the one or more porous rock fractures 106 and the absorber 102. In one or more embodiments, a scrubber, not pictured, may be added upstream of the absorber to scrub the $CO_2$-containing gas of sulfur oxides or nitrogen oxides. In one or more embodiments, the injection conduit 104 may be an injection well. In one or more embodiments, the production conduit 108 may be a production well.

Referring still to FIG. 1, in one or more embodiments upon entering the fractures, the $CO_2$-containing solution may experience a loss in pressure, as the pressure of the surrounding fractures 106 may be lower than the pressure inside the injection conduit 104. At higher temperatures and/or lower pressures, the carbon dioxide dissolved in the $CO_2$-containing solution may become less soluble and may come out of solution as gaseous carbon dioxide. The released carbon dioxide gas may form a gas region in the upper portions of the fractures 106. Without being bound by theory, it is believed that allowing carbon dioxide to come out of solution as gaseous carbon dioxide within the one or more porous rock fractures may improve the rate at which the one or more porous rock fractures sequester the carbon dioxide.

In one or more embodiments, the porous rock that comprises the one or more porous rock fractures may be permeable, such that carbon dioxide gas or liquid solvent may enter the pores of the porous rock. In some embodiments, the relative permeability of carbon dioxide gas and the liquid solvent may be such that permeability of carbon dioxide gas is much higher than that of the solvent. Without being bound by theory, it is believed that when the permeability of carbon dioxide is significantly larger than that of the solvent less of the solvent will enter the pores of the porous rock than would enter if the permeability of carbon dioxide was not as high relative to the permeability of the solvent. Solvent entering the pores of the porous rock may prevent carbon dioxide sequestration, as carbon dioxide gas may not be able to enter rock pores filled with solvent. Further, solvent that enters the pores may become trapped causing a loss of solvent, which may need to be replaced increasing the cost associated with the sequestration of carbon dioxide.

Figure 3:
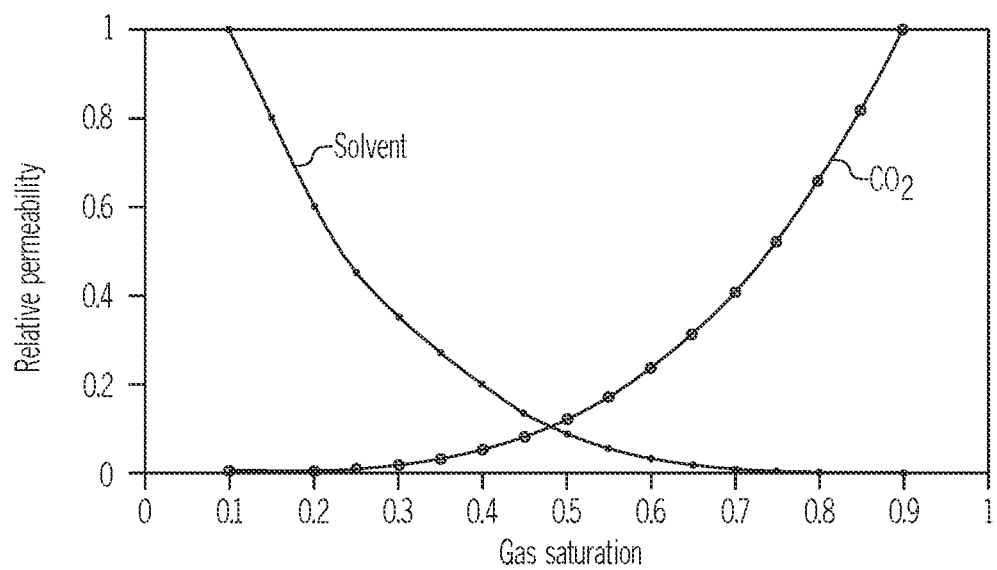
FIG. 3 is a graph showing the change in relative permeability of carbon dioxide gas and a solvent as gas saturation changes.

In embodiments where the porous rock fractures are permeable enough to allow liquid solvent to enter the pores of the porous rock, it may be necessary to alter the permeability of the porous rock to lower the amount of solvent that is allowed to permeate the rock. This may be done by increasing the gas saturation of the fractures. The gas saturation of the fractures may be increased by injecting a gas before the $CO_2$-containing solvent is injected. The injected gas may be $CO_2$, nitrogen, air, or any other suitable gas. As shown in FIG. 3, as gas saturation increases, the relative permeability of the carbon dioxide gas has a corresponding increase, while the relative permeability of the solvent has a corresponding decrease. Without being bound by theory, it is believed that by raising the gas saturation of the one or more fractures, less solvent may be allowed to permeate the porous rock of the one or more porous rock fractures, which may reduce the amount of solvent that becomes trapped within the pores of the porous rock and may increase the rate at which carbon dioxide gas is sequestered as more gas is allowed to enter the pores of the porous rock.

As described herein, in one or more embodiments, the released carbon dioxide may form stable carbonates by reacting with the porous rock fractures. For example, the released carbon dioxide may react with calcium oxide or magnesium oxide within the porous rock fractures to from calcium carbonate or magnesium carbonate. Without being bound by theory, it is believed that the formation of stable carbonates through the reaction between carbon dioxide and the porous rock of the one or more porous rock fractures may allow the carbon dioxide gas to be sequestered within the one or more porous rock fractures while lowering the potential for the sequestered carbon dioxide to be released back into the atmosphere when compared to other carbon sequestration method, that for example, do not form stable carbonates.

In one or more embodiments, the one or more porous rock fractures may be natural rock fractures. As used in the present disclosure, the term "natural rock fractures" refers to rock fractures that already exist within the rock, and that have not been formed by human actions. In one or more embodiments, the one or more porous rock fractures may be hydraulic or engineering fractures. As used in the present disclosure, the term hydraulic or engineering fractures" refers to rock fractures that have been formed by man-made means, such as by hydraulic fracturing.

In one or more embodiments, the $CO_2$-containing gas may comprise from 0.04 wt. % to 70 wt. % of carbon dioxide. For example, the $CO_2$-containing gas may comprise carbon dioxide in an amount from 0.04 wt. % to 60 wt. %, from 0.04 wt. % to 50 wt. %, from 0.04 to 40 wt. %, from 0.04 vol. % to 30 vol. %, from 0.04 vol. % to 20 vol. %, from 0.04 vol. % to 10 vol. %, from 0.04 vol. % to 1.0 vol. %, from 0.04 vol. % to 0.5 vol. %, from 0.5 vol. % to 60 vol. %, from 0.5 vol. % to 50 vol. %, from 0.5 vol. % to 40 vol. %, from 0.5 vol. % to 30 vol. %, from 0.5 vol. % to 20 vol. %, from 0.5 vol. % to 10 vol. %, from 0.5 vol. % to 1.0 vol. %, from 1.0 vol. % to 60 vol. %, from 1.0 vol. % to 50 vol. %, from 1.0 vol. % to 40 vol. %, from 1.0 vol. % to 30 vol. %, from 1.0 vol. % to 20 vol. %, from 1.0 vol. % to 10 vol. %, from 10 vol. % to 60 vol. %, from 10 vol. % to 50 vol. %, from 10 vol. % to 40 vol. %, from 10 vol. % to 30 vol. %, from 10 vol. % to 20 vol. %, from 20 vol. % to 60 vol. %, from 20 vol. % to 50 vol. %, from 20 vol. % to 40 vol. %, from 20 vol. % to 30 vol. %, from 30 vol. % to 60 vol. %, from 30 vol. % to 50 vol. %, from 30 vol. % to 40 vol. %, from 40 vol. % to 60 vol. %, from 40 vol. % to 50 vol. %, from 50 vol. % to 60 vol. %, or any combination of these ranges. In one or more embodiments, the $CO_2$-containing gas may be flue gas. For example, the $CO_2$-containing gas may be flue gas produced by a fossil fuel power plant.

In one or more embodiments, the method may further comprise scrubbing the flue gas of sulfur oxides or nitrogen oxides upstream of the absorber. In some embodiments, the flue gas may be scrubbed to reduce the amount of sulfur oxides and nitrogen oxides to an amount from 1 ppm to 10 ppm. For example, the flue gas may be scrubbed to reduce the amount of sulfur oxides and nitrogen oxides to an amount from 1 ppm to 9 ppm, from 1 ppm to 8 ppm, from 1 ppm to 7, ppm, from 1 ppm to 6 ppm, from 1 ppm to 5 ppm, from 1 ppm to 4 ppm, from 1 ppm to 3 ppm, from 1 ppm to 2 ppm, from 2 ppm to 10 ppm, 2 ppm to 9 ppm, from 2 ppm to 8 ppm, from 2 ppm to 7, ppm, from 2 ppm to 6 ppm, from 2 ppm to 5 ppm, from 2 ppm to 4 ppm, from 2 ppm to 3 ppm, from 3 ppm to 10 ppm, 3 ppm to 9 ppm, from 3 ppm to 8 ppm, from 3 ppm to 7, ppm, from 3 ppm to 6 ppm, from 3 ppm to 5 ppm, from 3 ppm to 4 ppm, from 4 ppm to 10 ppm, 4 ppm to 9 ppm, from 4 ppm to 8 ppm, from 4 ppm to 7, ppm, from 4 ppm to 6 ppm, from 4 ppm to 5 ppm, from 5 ppm to 10 ppm, 5 ppm to 9 ppm, from 5 ppm to 8 ppm, from 5 ppm to 7, ppm, from 5 ppm to 6 ppm, from 6 ppm to 10 ppm, from 6 ppm to 9 ppm, from 6 ppm to 8 ppm, from 6 ppm to 7 ppm, from 7 ppm to 10 ppm, from 7 ppm to 9 ppm, from 7 ppm to 8 ppm, from 8 ppm to 10 ppm, from 8 ppm to 9 ppm, from 9 ppm to 10 ppm, or any combination of these ranges. Without being bound by theory, it is believed that sulfur oxides and nitrogen oxides may react with or bind strongly to the $CO_2$-philic solvent, which may prevent it from absorbing carbon dioxide. The $CO_2$-philic solvent may then require an expensive reclaiming step to remove the sulfur oxides and nitrogen oxides to allow it to be reused for carbon dioxide absorption.

In one or more embodiments, the $CO_2$-philic solvent may be an aqueous solution comprising from 5.0 wt. % to 75 wt. % of one or more $CO_2$-philic materials. For example, the $CO_2$-philic solvent may comprise from 5.0 wt. % to 70 wt. % of one or more $CO_2$-philic materials, from 5.0 wt. % to 60 wt. %, from 5.0 wt. % to 50 wt. %, from 5.0 wt. % to 40 wt. %, from 5.0 wt. % to 30 wt. %, from 5.0 wt. % to 20 wt. %, 5.0 wt. % to 10 wt. %, from 10 wt. % to 75 wt. %, from 10 wt. % to 70 wt. %, from 10 wt. % to 60 wt. %, from 10 wt. % to 50 wt. %, from 10 wt. % to 40 wt. %, from 10 wt. % to 30 wt. %, from 10 wt. % to 20 wt. %, from 20 wt. % to 75 wt. %, from 20 wt. % to 70 wt. %, from 20 wt. % to 60 wt. %, from 20 wt. % to 50 wt. %, from 20 wt. % to 40 wt. %, from 20 wt. % to 30 wt. %, from 30 wt. % to 75 wt. %, from 30 wt. % to 70 wt. %, from 30 wt. % to 60 wt. %, from 30 wt. % to 50 wt. %, from 30 wt. % to 40 wt. %, from 40 wt. % to 75 wt. %, from 40 wt. % to 70 wt. %, from 40 wt. % to 60 wt. %, from 40 wt. % to 50 wt. %, from 50 wt. % to 75 wt. %, from 50 wt. % to 70 wt. %, from 50 wt. % to 60 wt. %, from 60 wt. % to 75 wt. %, from 60 wt. % to 70 wt. %, from 70 wt. % to 75 wt. %, or any combination of these ranges.

In one or more embodiments, the $CO_2$-philic material may comprise one or more amines, alkali metal carbonates, or amino acids. In some embodiments, the $CO_2$-philic material may comprise amines, but not alkali metal carbonates or amino acids, only alkali metal carbonates, but not amines or amino acids, or only amino acids, but not amines or alkali metal carbonates. In one or more embodiments, the one or more amines may be one or more primary, secondary or tertiary amines. In some embodiments, the one or more $CO_2$-philic materials may comprise one or more of monoethanolamine, diethanolamine, triethanolamine, 2-amino-2-methyl-1-propanol, piperazine, diglycolamine, piperglycine salts, sarcosine salts, lithium carbonate, sodium carbonate, or potassium carbonate.

In one or more embodiments, the $CO_2$-philic solvent may comprise from 0.0 wt. % to 15 wt. % of a co-solvent. For example, the $CO_2$-philic solvent may comprise a co-solvent in an amount from 0.0 wt. % to 12.5 wt. %, from 0.0 wt. % to 10 wt. % from 0.0 wt. % to 7.5 wt. %, from 0.0 wt. % to 5 wt. %, from 0.0 wt. % to 2.5 wt. %, from 0.0 wt. % to 1.0 wt. %, from 0.0 wt. % to 0.5 wt. %, from 0.5 wt. % to 15 wt. %, from 0.5 wt. % to 12.5 wt. %, from 0.5 wt. % to 10 wt. %, from 0.5 wt. % to 7.5 wt. %, from 0.5 wt. % to 5 wt. %, from 0.5 wt. % to 2.5 wt. %, from 0.5 wt. % to 1.0 wt. %, from 1.0 wt. % to 15 wt. %, from 1.0 wt. % to 12.5 wt. %, from 1.0 wt. % to 10 wt. %, from 1.0 wt. % to 7.5 wt. %, from 1.0 wt. % to 5 wt. %, from 1.0 wt. % to 2.5 wt. %, from 2.5 wt. % to 15 wt. %, from 2.5 wt. % to 12.5 wt. %, from 2.5 wt. % to 10 wt. %, from 2.5 wt. % to 7.5 wt. %, from 2.5 wt. % to 5 wt. %, from 5.0 wt. % to 15 wt. %, 5.0 wt. % to 12.5 wt. %, from 5.0 wt. % to 10 wt. % from 5.0 wt. % to 7.5 wt. %, from 7.5 wt. % to 15 wt. %, from 7.5 wt. % to 12.5 wt. %, from 7.5 wt. % to 10 wt. %, from 10 wt. % to 15 wt. %, from 10 wt. % to 12.5 wt. %, from 12.5 wt. % to 15 wt. %, or any combination of these ranges. In some embodiments, the co-solvent may be one or more aliphatic alcohols. For example, the co-solvent may be one or more of methanol, ethanol, propanol, isopropyl alcohol, butanol, isobutanol, ethylene glycol, trimethylene glycol, pentamethylene glycol, isobutene glycol, or glycerol.

As described herein, in one or more embodiments the $CO_2$-containing solution may be heated via the heat of one or more rock fractures to release at least a portion of the absorbed carbon dioxide and thereby regenerate the $CO_2$-philic solvent. In some embodiments, the one or more rock fractures may heat the $CO_2$-containing solution to a temperature of from 90° C. to 200° C. For example, the one or more rock fractures may heat the $CO_2$-containing solution to a temperature of from 90° C. to 190° C., 90° C. to 180° C., 90° C. to 170° C., 90° C. to 160° C., 90° C. to 150° C., 90° C. to 140° C., 90° C. to 130° C., 90° C. to 120° C., 90° C. to 110° C., 90° C. to 100° C., 100° C. to 200° C., 100° C. to 190° C., 100° C. to 180, 100° C. to 170° C., 100° C. to 160° C., 100° C. to 150° C., 100° C. to 140° C., 100° C. to 130° C., 100° C. to 120° C., 100° C. to 110° C., 110° C. to 200° C., 110° C. to 190° C., 110° C. to 180, 110° C. to 170° C., 110° C. to 160° C., 110° C. to 150° C., 110° C. to 140° C., 110° C. to 130° C., 110° C. to 120° C., 120° C. to 200° C., 120° C. to 190° C., 120° C. to 180, 120° C. to 170° C., 120° C. to 160° C., 120° C. to 150° C., 120° C. to 140° C., 120° C. to 130° C., 130° C. to 200° C., 130° C. to 190° C., 130° C. to 180, 130° C. to 170° C., 130° C. to 160° C., 130° C. to 150° C., 130° C. to 140° C., 140° C. to 200° C., 140° C. to 190° C., 140° C. to 180, 140° C. to 170° C., 140° C. to 160° C., 140° C. to 150° C., 150° C. to 200° C., 150° C. to 190° C., 150° C. to 180, 150° C. to 170° C., 150° C. to 160° C., 160° C. to 200° C., 160° C. to 190° C., 160° C. to 180, 160° C. to 170, 170° C. to 200° C., 170° C. to 190° C., 170° C. to 180, 180° C. to 200° C., 180° C. to 190° C., 190° C. to 200° C., or any combination of these ranges.

In one or more embodiments, the one or more porous rock fractures may have an internal pressure of from 100 psi to 35000 psi. For example the one or more porous rock fractures may have an internal pressure of from 100 psi to 30000 psi, from 100 psi to 25000 psi, from 100 psi to 20000 psi, from 100 psi to 15000 psi, from 100 psi to 10000 psi, from 100 psi to 5000 psi, from 100 psi to 2500 psi, from 100 psi to 1000 psi, from 100 psi to 500 psi, from 500 psi to 35000 psi, from 500 psi to 30000 psi, from 500 psi to 25000 psi, from 500 psi to 20000 psi, from 500 psi to 15000 psi, from 500 psi to 10000 psi, from 500 psi to 5000 psi, from 500 psi to 2500 psi, from 500 psi to 1000 psi, from 1000 psi to 35000 psi, from 1000 psi to 30000 psi, from 1000 psi to 25000 psi, from 1000 psi to 20000 psi, from 1000 psi to 15000 psi, from 1000 psi to 10000 psi, from 1000 psi to 5000 psi, from 1000 psi to 2500 psi, from 2500 psi to 35000 psi, from 2500 psi to 30000 psi, from 2500 psi to 25000 psi, from 2500 psi to 20000 psi, from 2500 psi to 15000 psi, from 2500 psi to 10000 psi, from 2500 psi to 5000 psi, from 5000 psi to 35000 psi, from 5000 psi to 30000 psi, from 5000 psi to 25000 psi, from 5000 psi to 20000 psi, from 5000 psi to 15000 psi, from 5000 psi to 10000 psi, from 10000 psi to 35000 psi, from 10000 psi to 30000 psi, from 10000 psi to 25000 psi, from 10000 psi to 20000 psi, from 10000 psi to 15000 psi, from 15000 psi to 35000 psi, from 15000 psi to 30000 psi, from 15000 psi to 25000 psi, from 15000 psi to 20000 psi, from 20000 psi to 35000 psi, from 20000 psi to 30000 psi, from 20000 psi to 25000 psi, from 25000 psi to 35000 psi, from 25000 psi to 30000 psi, from 30000 psi to 35000 psi, or any combination of these ranges.

In one or more embodiments, the method may further comprise selecting the $CO_2$-philic material in the $CO_2$-philic solvent based on the conditions of the one or more porous rock fractures, wherein one or more of pressure, temperature, or the type of porous rock fracture are used to select the $CO_2$-philic material. For example, the $CO_2$-philic material may comprise aqueous amino acids when the temperature of the one or more porous rock fractures is from 90° C. to 110° C., the $CO_2$-philic material may comprise aqueous amines when the temperature of the one or more rock fractures is from 115° C. to 150° C., the $CO_2$-philic material may comprise alkali metal carbonates when the temperature of the one or more rock fractures is from 130° C. to 150° C., and the $CO_2$-philic materials may be an inorganic salt, such as Potassium hydroxide, Potassium carbonate, or sodium hydroxide, when the temperature of the one or more rock fractures is greater than 150° C.

In one or more embodiments, the injection conduit and production conduit may form a single well. The production conduit may be a production pipe and the injection conduit may be an injection pipe annularly disposed about the production pipe. In one or more embodiments, the injection pipe may comprise perforations that may allow the $CO_2$-containing solution to travel out of the injection pipe and into the one or more porous rock fractures. In some embodiments, the size of the perforations may be varied to control the change in pressure the $CO_2$-containing solution experiences as it exits the injection pipe and enters the one or more porous rock fractures.

In one or more embodiments, where the injection conduit and the production conduit form a single well and where the single well may be formed by drilling into a rock formation to create a wellbore the method may further comprise fracturing the rock formation to create one or more rock fractures and inserting the single well into the wellbore.

Figure 2:
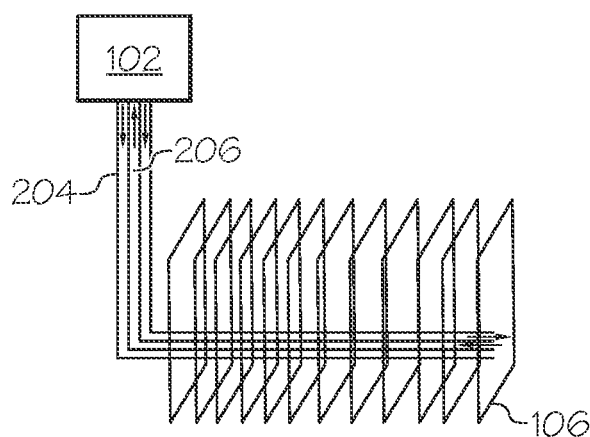
FIG. 2 is a schematic depiction of an alternative carbon sequestration system suitable for use with embodiments of the present disclosure.

Referring now to FIG. 2, an example system 200 that may be suitable for use with the methods described herein is schematically depicted. The example system 200 may be most suitable for use with embodiments of the method where the injection conduit and the production conduit form a single well. System 200 differs from the system 100 of FIG. 1 in that the injection conduit 104 may be an injection pipe 204 and the production conduit 108 may be a production pipe 206 placed together in a single well 202. The injection pipe 204 may be annularly disposed around the production pipe 206. In some embodiments, the injection pipe may be perforated with small holes to allow the $CO_2$-containing solution to exit the injection pipe and enter one or more porous rock fractures 106.

Embodiments herein may be useful over a wide range of rock formation conditions. Without being bound by theory, it is believed that when the one or more porous rock fractures have high permeability it may be beneficial to lower solvent residence time within the one or more rock fractures to limit potential solvent loss. It is believed that embodiments of the present disclosure where the production conduit and the injection conduit form a single well may have a lower solvent residence time when compared to embodiments of the present disclosure where the production conduit and injection conduit are separate wells.

Without being bound by theory, it is believed that when the one or more porous rock fractures have low permeability it may be beneficial to increase solvent residence time within the one or more fractures. It is believed that by increasing solvent residence time the gaseous carbon dioxide may have a better chance to release from the solvent and absorb into the pores of the rock fractures as the solvent flows through the one or more porous rock fractures. It is also believed that embodiments of the present disclosure where the production conduit and the injection conduit are separate wells may have longer solvent residence times within the one or more porous rock fractures as the solvent may have to travel farther from the one or more injection conduits through the fractures before it can exit via one or more production conduits.

In a first aspect of the present disclosure a method for the subterranean regeneration of $CO_2$-philic solvents and the sequestration of carbon dioxide may comprise exposing the $CO_2$-philic solvent to a carbon dioxide-containing gas in an absorber to allow the $CO_2$-philic solvent to absorb at least a portion of the carbon dioxide in the carbon dioxide-containing gas, thereby producing a $CO_2$-containing solution. The method may also comprise supplying the $CO_2$-containing solution to one or more porous rock fractures via one or more injection conduits in fluid communication with the one or more porous rock fractures. The method may also comprise heating the $CO_2$-containing solution via heat provided by one or more rock fractures in order to release at least a portion of the absorbed carbon dioxide into the one or more rock fractures and thereby regenerate the $CO_2$-philic solvent. The method may also comprise sequestering at least a portion of the released carbon dioxide within the one or more porous rock fractures by adsorbing the carbon dioxide within the porous rock fractures or by reacting the released carbon dioxide with the porous rock fractures to form stable carbonates. The method may finally comprise transporting the regenerated $CO_2$-philic solvent from the one or more porous rock fractures via one or more production conduits.

A second aspect of the present disclosure may include the first aspect where the method further comprises returning the regenerated $CO_2$-philic solvent to the absorber, such that the $CO_2$-philic solvent cycles between the one or more rock fractures and the absorber.

A third aspect of the present disclosure may include any of the previous aspects where the injection conduit is an injection well and the production conduit is a production well.

A fourth aspect of the present disclosure may include the first or second aspects where the injection conduit and the production conduit form a single well, the production conduit being a production pipe and the injection conduit being an injection pipe annularly disposed about the production pipe.

A fifth aspect of the present disclosure may include the fourth aspect where the single well is formed by drilling into a rock formation to create a wellbore and the method further comprises fracturing the rock formation to create one or more rock fractures and inserting the single well into the wellbore, where the single well comprises the production pipe and the injection pipe.

A sixth aspect of the present disclosure may include any of the previous aspects where the carbon-dioxide containing gas comprises from 0.04 wt. % to 70 wt. % of carbon dioxide.

A seventh aspect of the present disclosure may include any of the previous aspects where the carbon-dioxide containing gas is flue gas.

An eighth aspect of the present disclosure may include the seventh aspect, where the method further comprises scrubbing the flue gas of one or more sulfur oxides or nitrogen oxides upstream of the absorber.

A ninth aspect of the present disclosure may include any of the previous aspects where the $CO_2$-philic solvent is an aqueous solution comprising from 5 wt. % to 75 wt. % of one or more $CO_2$-philic material and from 0 wt. % to 15 wt. % of one or more co-solvents.

A tenth aspect of the present disclosure may include the ninth aspect where the one or more co-solvents comprise one or more aliphatic alcohols.

An eleventh aspect of the present disclosure may include the ninth aspect where the $CO_2$-philic materials comprise one or more of amines, alkali metal carbonates, or amino acids.

A twelfth aspect of the present disclosure may include the ninth aspect where the CO2-philic materials comprise one or more of monoethanolamine, diethanolamine, triethanolamine, 2-amino-2-methyl-1-propanol, piperazine, diglycolamine, glycine salts, sarcosine salts, lithium carbonate, sodium carbonate, or potassium carbonate.

A thirteenth aspect of the present disclosure may include any of the previous aspects where the one or more porous rock fractures are natural fractures.

A fourteenth aspect of the present disclosure may include any of the previous aspects where the one or more porous rock fractures are engineering or hydraulic fractures.

A fifteenth aspect of the present disclosure may include any of the previous aspects where the method further comprises comprising selecting the $CO_2$-philic solvent based on the conditions of the one or more porous rock fractures, wherein one or more of the pressure, temperature, or the type of porous rock fracture are used to select the $CO_2$-philic material.

What is claimed is:

1. A method for the subterranean regeneration of $CO_2$-philic solvents and the sequestration of carbon dioxide, the method comprising:
    exposing the $CO_2$-philic solvent to a $CO_2$-containing gas in an absorber to allow the $CO_2$-philic solvent to absorb at least a portion of the carbon dioxide in the $CO_2$-containing gas, thereby producing a $CO_2$-containing solution, wherein the $CO_2$-philic solvent comprises one or more $CO_2$-philic materials comprising one or more of amines, alkali metal carbonate, or amino acids;

supplying the $CO_2$-containing solution to one or more porous rock fractures via one or more injection conduits in fluid communication with the one or more porous rock fractures;

heating the $CO_2$-containing solution via heat provided by one or more rock fractures in order to release at least a portion of the absorbed carbon dioxide into the one or more rock fractures and thereby regenerate the $CO_2$-philic solvent;

sequestering at least a portion of the released carbon dioxide within the one or more porous rock fractures by adsorbing the carbon dioxide within the porous rock fractures or by reacting the released carbon dioxide with the porous rock fractures to form stable carbonates; and transporting the regenerated $CO_2$-philic solvent from the one or more porous rock fractures via one or more production conduits.

2. The method of claim 1 further comprising, returning the regenerated $CO_2$-philic solvent to the absorber, such that the $CO_2$-philic solvent cycles between the one or more rock fractures and the absorber.

3. The method of claim 1, wherein the injection conduit is an injection well and the production conduit is a production well.

4. The method of claim 1, wherein the injection conduit and the production conduit form a single well, the production conduit being a production pipe and the injection conduit being an injection pipe annularly disposed about the production pipe.

5. The method of claim 4, wherein the single well is formed by drilling into a rock formation to create a wellbore further comprising;

fracturing the rock formation to create one or more rock fractures; and inserting the single well into the wellbore, wherein the single well comprises the production pipe and the injection pipe.

6. The method of claim 1, wherein the $CO_2$-containing gas comprises from 0.04 wt. % to 70 wt. % of carbon dioxide.

7. The method of claim 1, wherein the $CO_2$-containing gas is flue gas.

8. The method of claim 7, further comprising scrubbing the flue gas of sulfur oxides or nitrogen oxides upstream of the absorber.

9. The method of claim 1, wherein the $CO_2$-philic solvent is an aqueous solution comprising:

from 5 wt. % to 75 wt. % of the one or more $CO_2$-philic materials; and from 0 wt. % to 15 wt. % of one or more co-solvents.

10. The method of claim 9, wherein the one or more co-solvents comprises one or more aliphatic alcohols.

11. The method of claim 9, wherein the $CO_2$-philic materials comprise one or more of monoethanolamine, diethanolamine, triethanolamine, 2-amino-2-methyl-1-propanol, piperazine, diglycolamine, glycine salts, sarcosine salts, lithium carbonate, sodium carbonate, or potassium carbonate.

12. The method of claim 1, wherein the one or more porous rock fractures are natural fractures.

13. The method of claim 1, wherein the one or more porous rock fractures are engineering or hydraulic fractures.

14. The method of claim 1, further comprising selecting the $CO_2$-philic solvent based on conditions of the one or more porous rock fractures, wherein a temperature of the porous rock fractures is used to select the $CO_2$-philic material.

* * * * *